United States Patent

[11] 3,545,456

[72] Inventor Henry Gabriel
 Bartlesville, Oklahoma
[21] Appl. No. 722,164
[22] Filed April 18, 1968
[45] Patented Dec. 8, 1970
[73] Assignee Phillips Petroleum Company
 a corporation of Delaware

[54] CIGARETTE FILTERS CONTAINING SELECTIVE ADSORBENTS
 11 Claims, No Drawings
[52] U.S. Cl. .................................................. 131/266,
 131/267
[51] Int. Cl. ...................................................... A24d 01/06
[50] Field of Search ........................................... 131/261,
 262(A), 265, 266, 264, 261(A), 17, 266;
 260/332.1

[56] References Cited
 UNITED STATES PATENTS

| | | | |
|---|---|---|---|
| 2,360,859 | 10/1944 | Evans et al. ................... | 208/240 |
| 2,435,404 | 2/1948 | Morris et al. ................. | 260/332.1 |
| 2,504,099 | 4/1950 | Morris et al. ................. | 260/332.1 |
| 2,810,728 | 10/1957 | Beesley et al. ................ | 260/332.1 |
| 2,976,297 | 3/1961 | Bluestone ..................... | 260/332.1 |
| 3,079,978 | 3/1963 | Cobb et al. .................... | 131/267X |
| 3,380,457 | 4/1968 | Schumacher et al. ........ | 131/17 |
| 3,381,690 | 5/1968 | Schumacher et al. ........ | 131/17 |

Primary Examiner—Melvin D. Rein
Attorney—Young and Quigg

ABSTRACT: This invention relates to the removal of tars from tobacco smoke employing a filter containing sulfolane derivatives.

CIGARETTE FILTERS CONTAINING SELECTIVE ADSORBENTS

BACKGROUND OF THE INVENTION

This invention relates to a new filter which selectively removes certain products of combustion from tobacco smoke, and particularly to cigarette, cigar, and pipe filters containing a chemical agent to selectively remove tars from tobacco smoke.

It has been thought by some to be desirable to provide a filter for cigarettes which removes tars from the tobacco smoke. While smoke of a somewhat reduced tar level may be obtained by providing a more efficient filter, such filters have certain limitations. Highly efficient filters are not necessarily desirable from the standpoint of the average smoker because the increased efficiency of the filter is achieved by greater internal surface area in the filter plug which results in a concomitant increase in the draw. In addition, an important limitation of filters of improved efficiency is that some of the tars are in the vapor state, and hence not amenable to filtration, no matter how efficient the filter may be.

Therefore, it is an object of this invention to provide a filter which will remove tars in the solid and vapor state from tobacco smoke.

Another object of this invention is to provide a filter which selectively removes tars from tobacco smoke with no increase in internal surface area of the filter plug and hence no increase in the draw.

SUMMARY OF THE INVENTION

According to the present invention, certain selective adsorbent compounds are incorporated into a conventional filter prepared from a fibrous material. In further accordance with this invention sulfolanes or substituted sulfolanes are incorporated into conventional cigarette, cigar, or pipe filters prepared from a fibrous material.

In still further accordance with the present invention, sulfolane or substituted sulfolanes, are incorporated either as crystalline solids or as adsorbed liquids into a conventional cigarette, cigar, or pipe filter prepared from a fibrous material in an amount equal to about 0.01 to about 25 percent of the total weight of the filter.

DESCRIPTION OF PREFERRED EMBODIMENT

The adsorbents of the invention comprise tetrahydrothiophene-1,1- dioxide, sulfolane, compounds having the formula:

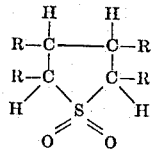

wherein each R is selected from hydrogen and alkyl groups containing from one to five carbon atoms per molecule.

Compounds of this type are readily prepared by the hydrogenation of the sulfones obtained by the reaction of conjugated dienes of the composition:

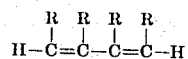

with sulfur dioxide. Typical members of this group of compositions suitable for use in the process of this invention are:

a. tetahydrothiophene-1,1-dioxide (derived from butadiene sulfone) M. Pt. 26°B. Pt. 110° C. at 3 mm. Hg, 285° C. at 760 mm. Hg (sulfolane).
b. 3-methyltetrahydrothiophene-1,1-dioxide (derived from isoprene sulfone) M. Pt. minus 5° C., B. Pt. 133°C. at 6 mm. Hg, 290° C. at 760 mm. Hg.
c. 2-methyltetrahydrothiophene-1,1-dioxide (derived from piperylene sulfone) B. Pt. 279° - 280° C./760 mm. Hg.
d. 2,5-dimethyltetrahydrothiophene-1,1-dioxide (derived from hexadiene-2,4-sulfone) B. Pt. 278° - 280° C./760 mm.
e. 3,4-dimethyltetrahydrothiophene-1,1-dioxide (derived from 2,3-dimethylbutadiene sulfone) B. Pt. 274° - 275° C./760 mm. Hg.

Methods for the synthesis of these compounds are described by Backer and Bolt, Rec, Trav. Chem. 54, 538—44 (1935); de Roy and Van Zuydewijm, Rec. Trav. Chem, 57, 445—455 (1938 ); Farlow (to duPont) U.S. Pat. No. 2,233,999, (1941) I.G. Farbenindustrie, French Pat. No. 847,254, (1939) Evans, Morris and Shokal (to Shell) U.S. Pat. Nos. 2,360,859 to 2,360,862, (1944); Morris and Van Winkle (to Shell) U.S. Pat. No. 2,435,404, (1948) and elsewhere.

Further representative examples of the tetrahydrothiophene-1,1-dioxide that can be employed by the process of this invention include: 2-ethyltetrahydrothiophene-1,1-dioxide 3-ethyltetrahydrothiophene-1,1-dioxide 3,4-diethyltetrahydrothiophene-1,1-dioxide 3-methyl-2,5-diethyl-tetrahydrothiophene-1,1-dioxide 2,3,4,5-tetramethyl-tetrahydrothiophene-1,1-dioxide 3,4-dibutyl-tetrahydrothiophene-1,1-dioxide 3,4-dipropyl-tetrahydrothiophene-1,1-dioxide 3,4-dipentyl-tetrahydrothiophene-1,1-dioxide 3-butyl-4-pentyl-tetrahydrothiophene-1,1-dioxide For simplicity tetrahydrothiophene-1,1-dioxide hereinafter referred to as sulfolane will be used for illustrative purposes.

Typical properties of sulfolane are given in the following table:

TABLE I

Typical Properties of Sulfolane

| | |
|---|---|
| Specific gravity, 30/4 C | 1. 261 |
| Molecular weight | 120 |
| Melting point, ° F | 75 |
| Boiling point at 760 mm. Hg, ° F | 545 |
| Viscosity at 30 C, cp | 10. 34 |
| Flash point COC, ° F | 330 |
| Refractive index 30 C | 1. 481 |
| Stability | (¹) |
| Vapor pressure (mm. Hg) at— | |
| 248° F | 20 |
| 313° F | 30 |
| 343° F | 50 |
| 381° F | 100 |
| 410° F | 150 |
| 433° F | 198 |
| 446° F | 201 |

¹ 432° F.

Tests conducted in experimental animals using sulfolane show that this compound is essentially innocuous by all routes of adsorption into the body. Toxicity by ingestion is low, reaction of the skin even from prolonged or repeated contact is minimal. Irritation to the eye from liquid contact is moderate and transient. Because of the high boiling point temperature of sulfolane and its very low pressure at ambient temperatures problems of inhalation and vapor exposure are unlikely.

The fibrous material of the filters within the scope of this invention are those which have found common acceptance for cigarette, cigar, and pipe filters. Cellulose, regenerated cellulose, cellulose acetate or other cellulosic fibers are the most economical and commercially preferred materials. Such fibers are normally cured in the form of a rope or tow and the tow manufactured into a compact plug by methods known in the art to form a filter having a plurality of tortuous passages to trap solid and liquid particulate matter which may be present in tobacco smoke. However, the filter may be composed of natural fibers, mineral fibers, and other synthetic fibers such as nylon, polypropylene, and polyethylene, mixtures of synthetic, mineral and natural fibers are also suitable.

The filter fibers referred to above provide support for the adsorbent compounds of the present invention and accordingly no particular form of or type of materials of fabric is required for the successful practice of this invention.

A typical filter cigarette comprises a plug of shredded tobacco and superimposed thereupon a tip comprising a plug of compact fibrous based material. The filter tip and tobacco are joined in a unitary structure in suitable wrapping paper. In the practice of the present invention the fiber base is impregnated with the sulfolane or sulfolane derivatives referred to above. Depending upon the method of impregnation, the selective adsorbents may form a thin film over the individual strands of the fibrous material or may be adsorbed into the fibrous material, or may be in the form of a crystalline powder, supported by the fibrous based material.

The adsorbent compound according to the present invention may be applied to the filter fibers before or after formation of the plug. The adsorbent compound may range from about 0.01 to 25 weight percent of the filter depending upon the manner in which the adsorbent compound is used. When the sulfolane is incorporated into the filter as a crystalline powder, it is preferred to use the sulfolane in an amount equal to about 5 to 25 weight percent of the filter. When the sulfolane is incorporated into the filter as a thin film over the individual strands of the fibrous material or adsorbed into the fibrous material, it is preferred to use the sulfolane in an amount equal to about 0.01 to 5 weight percent of the filter.

Filters containing sulfolane were prepared and test smoked according to the following examples.

EXAMPLE I

Lightweight cellulose paper and sterile cotton were moistened with sulfolane. Both samples were allowed to stand in a stoppered flask for 2—3 hours. The two sample filters containing 2 percent by weight of sulfolane were each inserted in a plastic mouthpiece. A cigar and cigarillo were test smoked for filter action and taste, employing both samples separately. No offensive taste or odor was noted.

EXAMPLE II

A commercial filter cigarette was treated with 1 percent by weight of sulfolane and test smoked. The smoke was milder than normal cigarettes without any after effects. Both a treated and untreated commercial cigarette was smoked in the above manner. Said filters were removed and opened after completion of the test. The filter treated with sulfolane showed tar deposits deeper in color in the treated cigarette than the untreated cigarette, especially in the filter section adjacent to the tobacco end of the test cigarettes.

I claim:

1. The method of purifying tobacco smoke comprising passing said smoke through a filter support of fibrous material or the like having a plurality of smoke passageways therethrough containing at least one compound selected from the group consisting of:

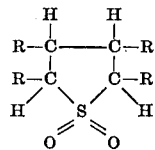

wherein each R is selected from hydrogen and alkyl groups containing from 1—5 carbon atoms per molecule.

2. A method according to claim 1 wherein said compound is tetrahydrothiophene-1,1-dioxide.

3. A method according to claim 1 wherein said compound is dispersed on said filter by absorbing said compound on said filter element as a liquid.

4. A method according to claim 3 wherein the concentration of said compound is about 0.01 to 5 weight percent of the total weight of the filter.

5. A method according to claim 1 wherein said compound is dispersed within said filter as a crystalline solid.

6. A method according to claim 5 wherein the concentration of said compound is about 5 to 25 weight percent of the total weight of the filter.

7. A method according to claim 1 wherein said fibrous filter material, is selected from the group consisting of cellulose, substituted cellulose, nylon, polypropylene and polyethylene fibers, and said compound is selected from the group consisting of tetrahydrothiophene-1,1-dioxide, 3-methyl-tetrahydrothiophene-1,1-dioxide, 2-methyl-tetrahydrothiophene-1,1-dioxide, 2,5-dimethyl-tetrahydrothiophene-1,1-dioxide and 3,4-dimethyl-tetrahydrothiophene 1,1-dioxide.

8. A filter tip cigarette having in combination an elongated cylindrical plug of shredded tobacco joined at one end thereof with a filter element of fibrous material or the like having a plurality of smoke passages, said filter being effective to trap particulate matter in tobacco smoke, said filter containing at least one compound selected from the group consisting of:

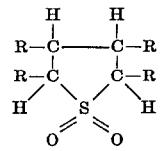

wherein each R is selected from hydrogen and alkyl groups containing from 1—5 carbon atoms per molecule.

9. A filter according to claim 8 wherein said compound is tetrahydrothiophene-1,1-dioxide.

10. A filter according to claim 8 wherein the concentration of said compound is about 0.01 to 25 weight percent of the total weight of the filter.

11. A filter according to claim 10 wherein said fibrous filter material is selected from the group consisting of cellulose, substituted cellulose, nylon, polypropylene and polyethylene fibers, and said compound is selected from the group consisting of tetrahydrothiophene-1,1-dioxide, 3-methyl-tetrahydrothiophene-1,1-dioxide, 2-methyl-tetrahydrothiophene-1,1-dioxide, 2,5-dimethyl-tetrahydrothiophene- 1,1-dioxide and 3,4-dimethyl-tetrahydrothiophene-1,1-dioxide.